United States Patent [19]

Mahoney

[11] Patent Number: 5,681,457
[45] Date of Patent: Oct. 28, 1997

[54] ELECTRODYNAMIC FLUID TREATMENT SYSTEM

[76] Inventor: Robert F. Mahoney, 126 Cherry St., Edinboro, Pa. 16412

[21] Appl. No.: 540,460

[22] Filed: Oct. 10, 1995

[51] Int. Cl.$^6$ .................................. C02F 1/48; C02F 1/36
[52] U.S. Cl. .................. 210/198.1; 210/696; 210/748; 422/20; 422/22; 204/660; 204/667
[58] Field of Search ................................ 210/748, 696, 210/198.1; 422/20, 22; 204/149, 660, 667

[56] References Cited

U.S. PATENT DOCUMENTS

| | | |
|---|---|---|
| 3,788,473 | 1/1974 | King . |
| 3,843,507 | 10/1974 | Kwan ........................ 204/302 |
| 4,012,310 | 3/1977 | Clark et al. . |
| 4,042,509 | 8/1977 | Bowen ........................ 210/192 |
| 4,049,535 | 9/1977 | Winslow, Jr. . |
| 4,056,451 | 11/1977 | Hodgson . |
| 4,139,441 | 2/1979 | Bose . |
| 4,293,400 | 10/1981 | Liggett ........................ 204/302 |
| 4,988,427 | 1/1991 | Wright . |
| 5,049,248 | 9/1991 | Muralidhara et al. ........................ 204/149 |
| 5,305,737 | 4/1994 | Vago . |
| 5,352,347 | 10/1994 | Reichert . |

FOREIGN PATENT DOCUMENTS

| | | |
|---|---|---|
| 27 04 268 | 8/1978 | Germany . |
| 1006385 | 3/1983 | U.S.S.R. . |

Primary Examiner—Neil McCarthy
Attorney, Agent, or Firm—Richard C. Litman

[57] ABSTRACT

A unit for removal and prevention of scale deposits in a preexisting fluid containing system and destruction of microbes. The invention utilizes a.c. and d.c. superimposed electrical fields in combination with a sonic or ultrasonic transducer for supplying electrical and mechanical energy into a colloidal or particulate-containing solution. An impure fluid stream of reduced conductivity is passed between a cylindrical insulated electrode, having a first end and a second end, which electrode is axially centered within an insulated cylindrical electrode and housing. The configuration of the electrodes form a sealed cylindrical treatment chamber, having a inlet and an outlet for a fluid stream, and provide an electric field of a.c. waveforms superimposed on d.c. waveforms, comprising a resultant ripple voltage waveform. The ripple voltage is obtained by rectifying and filtering a standard and commercially available a.c. voltage. A sonic or ultrasonic transducer in combination with a deflecting cone axially affixed to the second end of the electrode is provided to emit sonic energy through the fluid stream for removal of scale deposits from the walls of preexisting closed fluid containing system and destruction of microbial organisms.

4 Claims, 4 Drawing Sheets

ELECTRODYNAMIC FLUID TREATMENT SYSTEM

BACKGROUND OF THE INVENTION

1. Field of the Invention

The present invention relates to a particle ionizing unit for destruction of microorganisms and removal and prevention of scale build-up in a closed fluid containing system. The invention utilizes a.c. and d.c. superimposed electrical fields in combination with a sonic or ultrasonic transducer to supply electrical and mechanical energy into a colloidal and or particulate containing aqueous solution.

2. Description of the Prior Art

The use of electrostatic separation to treat suspended solids and ionic particles in fluids is well known. However, the prior art teaches away from the present invention's intended purpose of removing deposited scales in a closed fluid containing system. By utilizing a.c. and d.c. superimposed electrical fields (as a ripple voltage waveform) in combination with a sonic or ultrasonic transducer, electrical and mechanical energy are supplied into a colloidal or particulate containing aqueous solution to resolubilize and ionize larger particles.

Generally, a high voltage potential of substantially unvarying intensity (d.c. potential) can be maintained between two insulated electrodes creating a polarized electrical field while fluid is passed between the electrodes into such field. Polar or charged impurity particles are thus moved towards an oppositely charged electrode. However, as the particles are drawn across the field, they collide with one another and coalesce. Eventually, these nucleated particles are precipitated or adhere to a dielectric surface which is specifically provided for that purpose (e.g. glass beads) or which coincidentally insulates the electrode.

The field of water-in-oil emulsion separation has also spawned various inventions having a.c. potentials supplied to treat mixtures for separation of polar molecules (e.g. water) mixed with non-conductive, organic fluids. For example, U.S. Pat. No. 4,049,535 issued Sep. 20, 1977 to Winslow, Jr. describes an electrical field treater for resolving water-in-oil emulsions by grading of a.c.-d.c. electrical fields. The treater vessel has an emulsion inlet, an oil phase outlet and a water phase outlet; electrodes are mounted within the vessel in the flow path of fluid moving between the inlet and outlets. First and second sets of electrodes are adapted to be energized so that a single power source provides a plurality of d.c. potentials and currents, separately from one another without interference, and without danger of a current unbalance destroying the utility of the power source.

U.S. Pat. No. 4,056,451 issued Nov. 1, 1977 to Hodgson describes a dual field electric treater for creating pulse intervals which allow for the separation of a water-in-oil emulsion provided in a conventional multi-tray emulsion treater while reducing the chance of formation of damaging continuous water threads between electrodes. A first group of trays is provided with insulated electrodes supplied with an a.c. potential, and each tray of succeeding pairs of trays are connected to opposite ends of an a.c. transformer secondary through rectifiers. A pulsed d.c. potential is provided by half-wave rectification of the secondary voltage applied separately to the two trays in the pair. In this manner, the transformer remains uniformly loaded for maximum treatment potential and pulse intervals are made sufficiently long so that no chance exists for a continuous thread of water to form between the electrodes.

U.S. Pat. No. 4,139,441 issued Feb. 13, 1979 to Bose describes an electrofiltration device using an improved method for separating subdivided solids from a liquid having a low electrical conductivity, by subjecting the liquid to pretreatment with an electrostatic field of oscillating intensity, especially a field of oscillating alternating polarity. A pretreatment chamber is utilized to subject a mixture of liquid and solids to at least one electric field of oscillating intensity, e.g. a field of alternating, 60 hertz bidirectional polarity, produced using high-voltage a.c. potential (preferably 500 V or higher) or half-wave rectified potential sources, commercially available via ordinary commercial power supplies, transformers, and rectifiers. In the case of solids with substantial conductivity, the use of a dielectric shield on the electrode is noted.

U.S. Pat. No. 4,988,427 issued Jan. 29, 1991 to Wright describes a system using electrodes in contact with working fluids, mixtures or slurries of solids or semi-solids in an ionizable liquid, having a suitable conductivity to create a flux field using from about 100 to 400 amps of 240 V electricity. Current passes through the working fluids and agitates the mixture by electrically heated convection. U.S. Pat. No. 5,352,347 issued Oct. 4, 1994 to Reichert describes an easily removable electrostatic filter for non-conductive liquids. The liquids pass through a charged electric field of a filter cartridge, made up of concentric, spaced electrically conductive tubes having foam cell filter members disposed in the space between the tubes with an opposite electric charge provided to each adjacent tube. Charged particles migrate to oppositely charged tubes and larger particles are trapped within the filter cells.

Other particle separators are known to apply electric fields to impure water to first coagulate particles and subsequently separate the nucleated particles from the water. For example, U.S. Pat. No. 3,788,473 issued on Jan. 29, 1974 to King describes a particle separator in which electric fields act on impure water to obtain a polarizing action within the water to free undesired impurity ions from water molecule clusters to permit formation of ionic crystals by nucleation or coagulation. The nucleated solution, obtained by passing the solution between a pair of electrodes, is fed into the separator to run over an electrically conductive wall maintained at ground potential, which wall is also maintained at a reduced temperature. The result is that nucleated materials deposit on the wall and in a catch basin below it. Soviet publication no. 1006385 published Mar. 23, 1983 by Zakhvatov describes an process to remove iron from water by electrolysis using graphite electrodes, wherein it was found that a.c. superimposed on d.c. at the anode and cathode decreases the iron concentration in the water.

U.S. Pat. No. 4,012,310 issued Mar. 15, 1977 to Clark et al. describes an electrostatic water treatment system in which a high voltage d.c. supply is alternately turned on and off at lower and upper voltage limits to save power while maintaining adequate voltage on the electrode for performing the water treatment. An electrode is at the center of an externally grounded shell through which water which is treated flows. When on, the insulated electrode is positively charged with a d.c. voltage in a range of 1000 to 12000 volts. During the off period (when the voltage between one terminal and a constant voltage reference terminal exceeds a predetermined reference value), the voltage between the electrode and the shell discharges. Below the predetermined threshold, the cycle repeats. A coincidental a.c. voltage is thus produced by such on-off operation and is applied for use in a control circuit to check proper operation of the system. Moreover, if the insulation breaks down, the current exceeds a predetermined value and the entire unit is shut down. Such system utilizes the on-off operation only to save power and as a system check while maintaining an adequate voltage to settle out mineral and biological material, which settled material may be periodically flushed out the system. This invention is also described in German Offenlegunsschrift No. 27 04 268 published Aug. 10, 1978 by Clark et al.

Finally, U.S. Pat. No. 5,305,737 issued Apr. 26, 1994 to Vago describes an ultrasonic treatment system for cleaning inanimate objects and killing biotic organisms. However, this system is not associated with electrostatic treatment systems.

None of the above inventions and patents, taken either singly or in combination, is seen to describe the instant invention as claimed.

SUMMARY OF THE INVENTION

The present invention relates to a particle ionizing unit for removal and prevention of scale deposits in a fluid containing system and destruction of microorganisms. The invention utilizes a.c. and d.c. superimposed electrical fields in combination with a sonic or ultrasonic transducer for supplying electrical and mechanical energy into a colloidal or particulate-containing aqueous solution. In the preferred embodiment, an impure fluid stream of reduced conductivity is passed across a cylindrical insulated electrode, having a first end and a second end, which electrode is axially centered within an insulated cylindrical sheath. The configuration of the electrode and sheath forms a sealed cylindrical treatment chamber, having an inlet and an outlet for a fluid stream. An electric field of a.c. waveforms superimposed on d.c. waveforms is supplied across the fluid stream, having a minimum d.c. field intensity of 2000 V/inch, which intensity may be varied as a function of the separation between the electrodes and the voltage applied. Such applied electric field is defined by a ripple voltage obtained by rectifying and filtering a standard and commercially available a.c. voltage (household 60 Hz, 110 V). The a.c. component of the resultant field (the ripple voltage) is a function of the degree of filtering applied to the d.c. power supply, and is controlled utilizing computer control boards housed at the first end of the electrode in operable communication with the electrode.

When the d.c. potential is supplied to the electrode, the field created moves charges in the fluid stream. Because negative charges are strongly attracted to the positive terminal of the electrode, a relatively thin layer of negatively charged particles accumulates next to the dielectric material insulating the positive terminal of the electrode. The inventor has found that the resulting build-up of negative charge is disrupted when the ripple voltage is applied and further causes an excitement and ionization effect on the accumulated particles. This ionization effect further results in the return of particles into solution for removal with the fluid stream (effluent), with a higher concentration of salt ions in the resulting effluent causing the effluent to be more highly conductive.

A sonic or ultrasonic transducer is provided to add mechanical energy to the closed fluid containing system. In the preferred embodiment, a transducer capable of operating at 42,000 cps and consuming only 100 watts of power imparts kinetic energy throughout the fluid stream to further excite the particles. In the preferred embodiment, the transducer is positioned in axial relation at the second end of the electrode. The sonic energy emitted thus passes along a line parallel to the longitudinal axis of the electrode. The inventor has found that efficiency of the invention is improved by deflecting the sonic energy around the electrode by utilizing a dielectric deflecting cone mounted at the second end of the electrode. The sonic energy so imparted through the fluid stream translates kinetic energy to the particles which increases ionization and enhances the ionization effect. Moreover, the sonic energy also travels in waves effectively producing minuscule voids in the fluid which instantaneously implode. These implosions occurring near scale deposits result in removal of scale deposits from the walls of the closed fluid containing system. An added advantage of the sonic or ultrasonic transducer is the destruction of any microbial organisms.

Accordingly, it is a principal object of the invention to provide a means of removing scale deposits and ionizing particulate solutes in a fluid containing system by applying an electrical field of a.c. superimposed on d.c. waveforms.

It is another object of the invention to provide a means of removing scale deposits, ionizing particulate solutes and purifying water in a fluid containing system by applying an electrical field of a.c. superimposed on d.c. waveforms in combination with a sonic or ultrasonic transducer.

It is a further object of the invention to provide a means of removing scale deposits and ionizing particulate solutes in a fluid containing system by passing a fluid stream in an annular flow along electrodes supplied by a d.c. power supply and creating a ripple voltage.

Still another object of the invention is to provide a low energy-consuming means using an a.c. current to supply a ripple voltage component to electrodes for removing scale deposits and ionizing particulate solutes in a fluid containing system.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention relates to a particle ionizing unit for destruction of microorganisms and removal and prevention of scale build-up in a closed fluid containing system. The invention utilizes a.c. and d.c. superimposed electrical fields in combination with a sonic or ultrasonic transducer to supply electrical and mechanical energy into a colloidal and or particulate containing aqueous solution.

Figure 1:
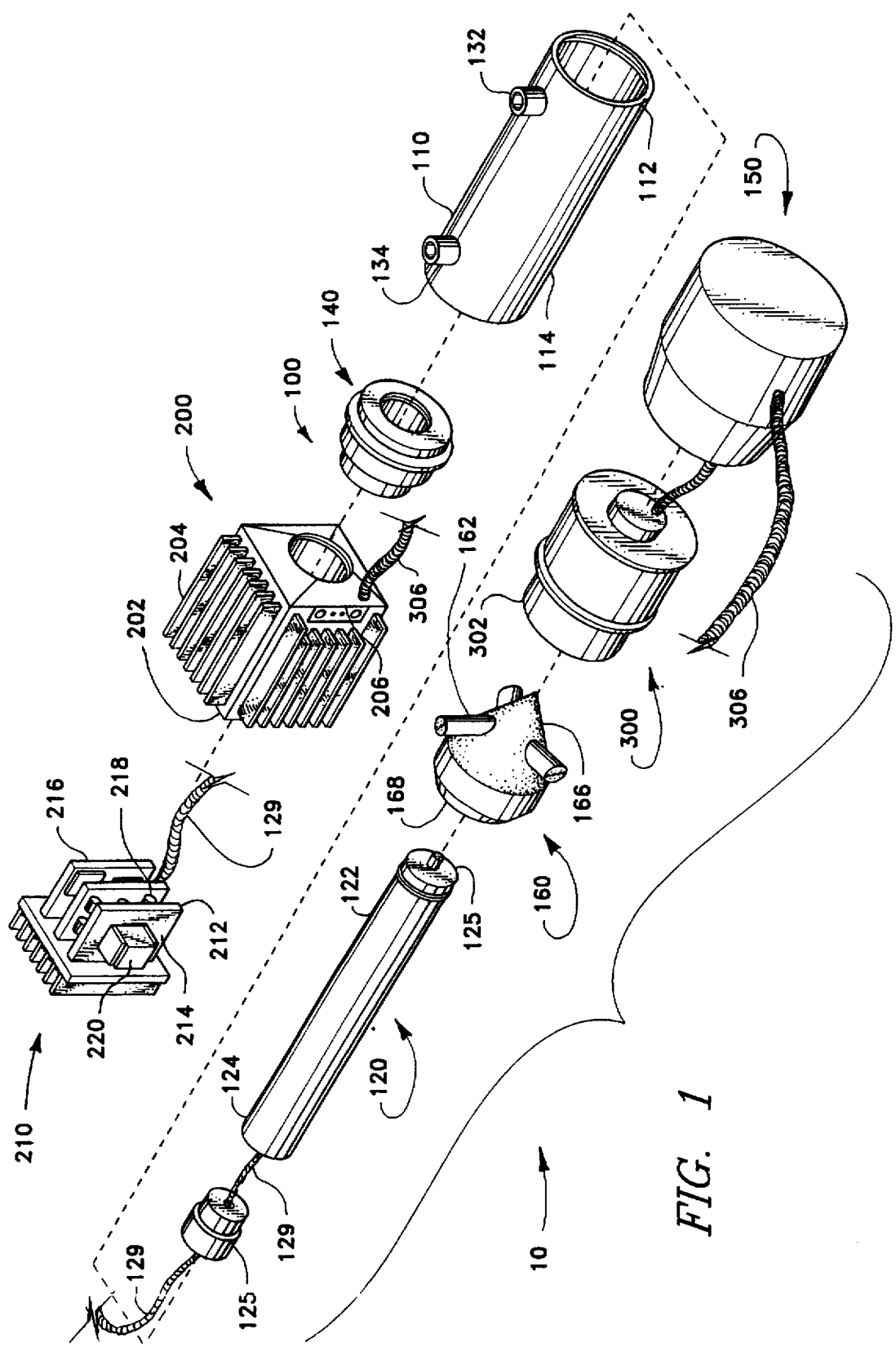
FIG. 1 is an exploded perspective view of the electrodynamic fluid treatment system.
Figure 1A:
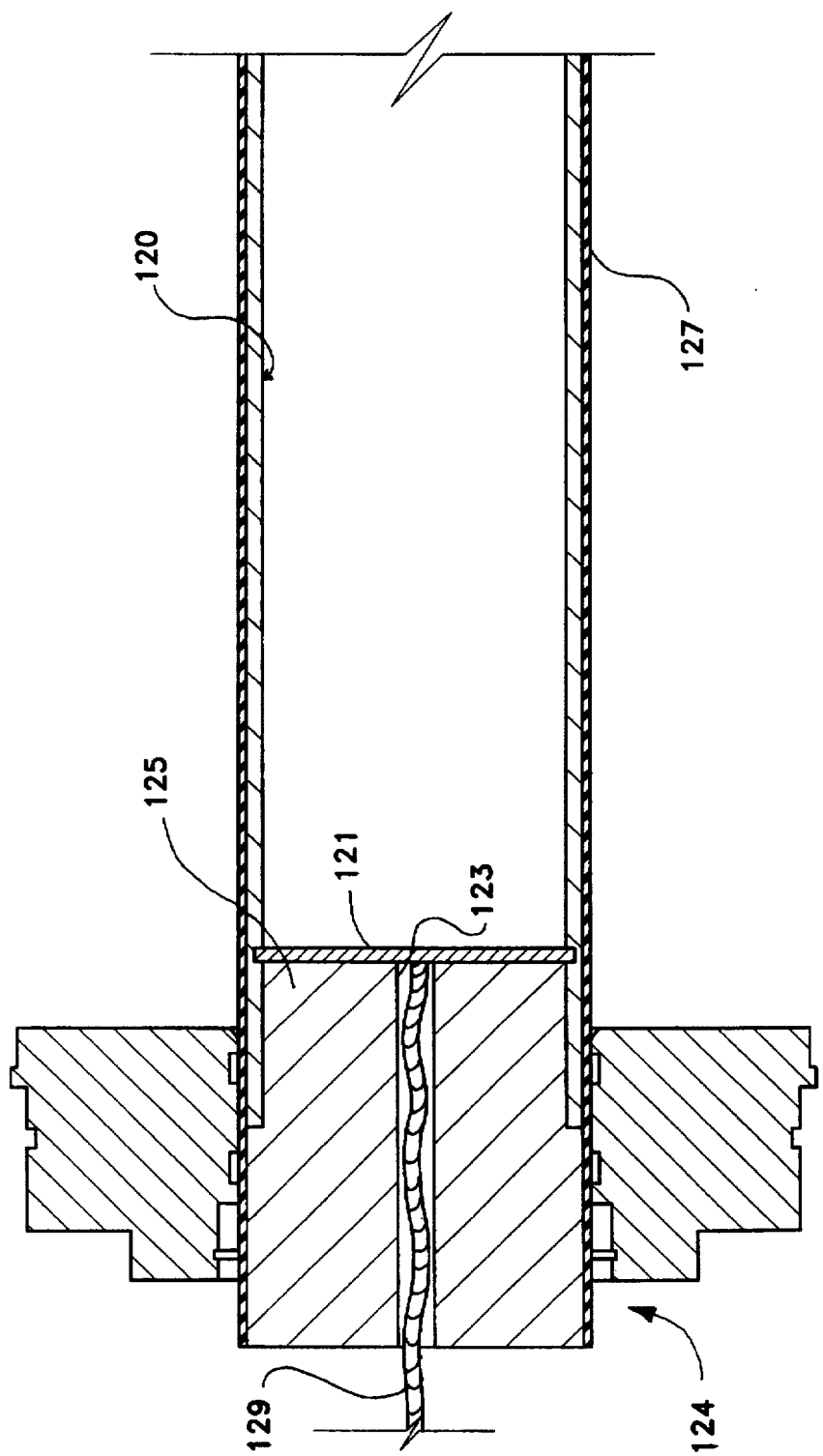
FIG. 1A is an isolated cross sectional view of the electrode and dielectric member of the electrodynamic fluid treatment system.
Figure 2:
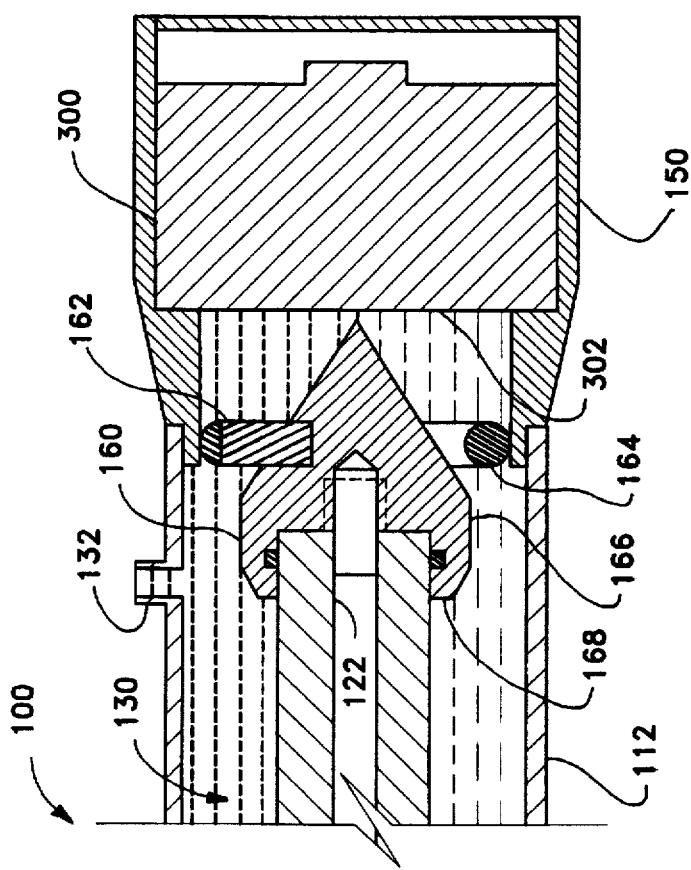
FIG. 2 is a cross sectional view of the treatment chamber component of the electrodynamic fluid treatment system.
Figure 2:
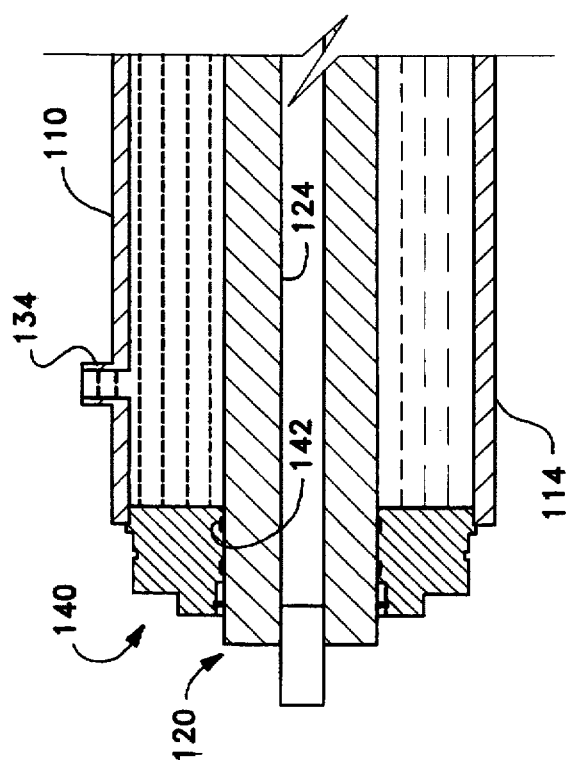

The preferred embodiment of the electrodynamic fluid treatment system 10 is shown in overview in FIG. 1 as a multi-part assembly, made up of two main components: a fluid treatment chamber component, which is isolated in whole in FIG. 2, isolated in part in FIG. 1A, and generally identified at 100 in FIG. 1, and a control component, which is generally identified at 200 in FIG. 1.

As seen in both FIG. 1 and FIG. 2, the treatment chamber component 100 is made up of an outer cylindrical sheath 110, having a near end 112 and a far end 114, and an inner elongated cylindrical electrode 120, having a first end 122 and a second end 124, to which a dielectric members 125 are attached to prevent grounding of the electrode 120. The electrode 120 and the sheath 110 may be constructed of any conductive rigid material, such as copper, graphite or stainless steel.

When assembled, the electrode 120 is insulated from direct contact with the sheath 110 and forms a chamber 130 for treatment of a fluid. The chamber 130 is accessed by an inlet 132 and an outlet 134, each capable of being attached to a preexisting fluid containing system. The chamber 130 is sealed at the far end 114 by an annular sealing member 140 which serves three functions: (1) a dielectric support for the electrode 120 engagingly seated to the far end 114 of and within the sheath 110, (2) a sealing closure for the treatment chamber 130 to prevent escape of the treated fluid, and (3) a locking unit for removable attachment of the control component 200.

A dielectric housing 150 is attached to the near end 112 and contains a sonic or ultrasonic transducer 300 for the emission of sonic energy through the fluid. An emitting face 302 of the transducer 300 is positioned in axial relation to the first end 122 of the electrode 120. The sonic energy is emitted from the face 302 through the chamber 130 towards the first end 122 of the electrode 120. The dielectric housing 150 also serves as a sealing closure for the treatment chamber 130 at the near end 112 to prevent escape of the fluid.

Within the sheath 110 at a near end 112, a sonic deflector 160 is housed between the transducer 300 and second end 124 of the electrode 120. The sonic deflector 160 has a conical end 166 and an electrode receiving end 168. The deflector 160, which may be made of a non-conductive material such as PVC, is supported within the sheath 110 by a plurality of arms 162 made of a dielectric material, such as nylon, nylatron GS, polyethylene, polypropylene, polyurethane, styrene, teflon, etc. The choice of materials depends upon variables associated with the treated fluid, such as temperature, chemical composition, etc. The arms 162 may extend to an annular ring 164 of an outer diameter adapted to matingly seat upon the inside surface of the sheath 110. The conical end 166 is proximate to the emitting end 302 of the transducer 300 and is axially aligned therewith. Thus, the sonic emissions are reflected by the conical end 166 to travel along a line generally following the longitudinal axis of the electrode 120.

The fluid treatment chamber component 100 is arranged to be sealed and separated from the control component 200 so as to avoid leakage of the fluid between the electrode 120 and the annular sealing member 140. As can be best appreciated from FIG. 2, a pair of resilient O-rings 142 form the seal between the chamber 130 and a finned housing 202. The housing 202 contains the necessary and appropriate control chip and circuit boards 210 for the production of the ripple voltage waveform. A high voltage board 212 and transformer board 214 having appropriately circuited diodes and transistors 218 are shown, which are in operable communication by wire 129 with electrode 120. Boards 212 and 214 are adapted to rectify and filter a standard and commercially supplied a.c. voltage (household 60 Hz, 110 V) (power source not shown). The transformer board 214, showing a 1100 V transformer 220 capable of stepping up the voltage to 2000 V. A sonic transducer control board 216 having a 100 V transformer is shown in operable communication with the transducer 300 via a wire 306 external to the sheath 10 and passing through the dielectric housing 150 and finned housing 202. The housing 202 has fins 204 for the dissipation of heat produced by the transformers and is removably attached to the annular sealing member 140, such as by a locking ring mechanism. The housing 202 also contains a series of indicator lamps and fuses in a control panel 206 operably connected with the control boards 210.

As isolated in FIG. 1A, the electrode 120 is operably attached to the high voltage board 212 by a wire 129 passing through a channel 123 in the dielectric member 125. The wire 129 is attached to a conductive plate 121 attached to the interior of the electrode 120. The electrode 120 is further insulated with a minimum of 20/1000 inch of insulation 127, which may consist of any dielectric material found in the prior art, such as heat shrinkable teflon FEP, TFE, PFN, polypropylene, kyndar polyolefin (FP301), etc. Referring again to FIG. 1 and FIG. 2, the electrode 120 is supported within the sheath 110 by the dielectric member 125 seated within a passage defined by the annular sealing member 140, which in turn seals the chamber 130.

Figure 3:
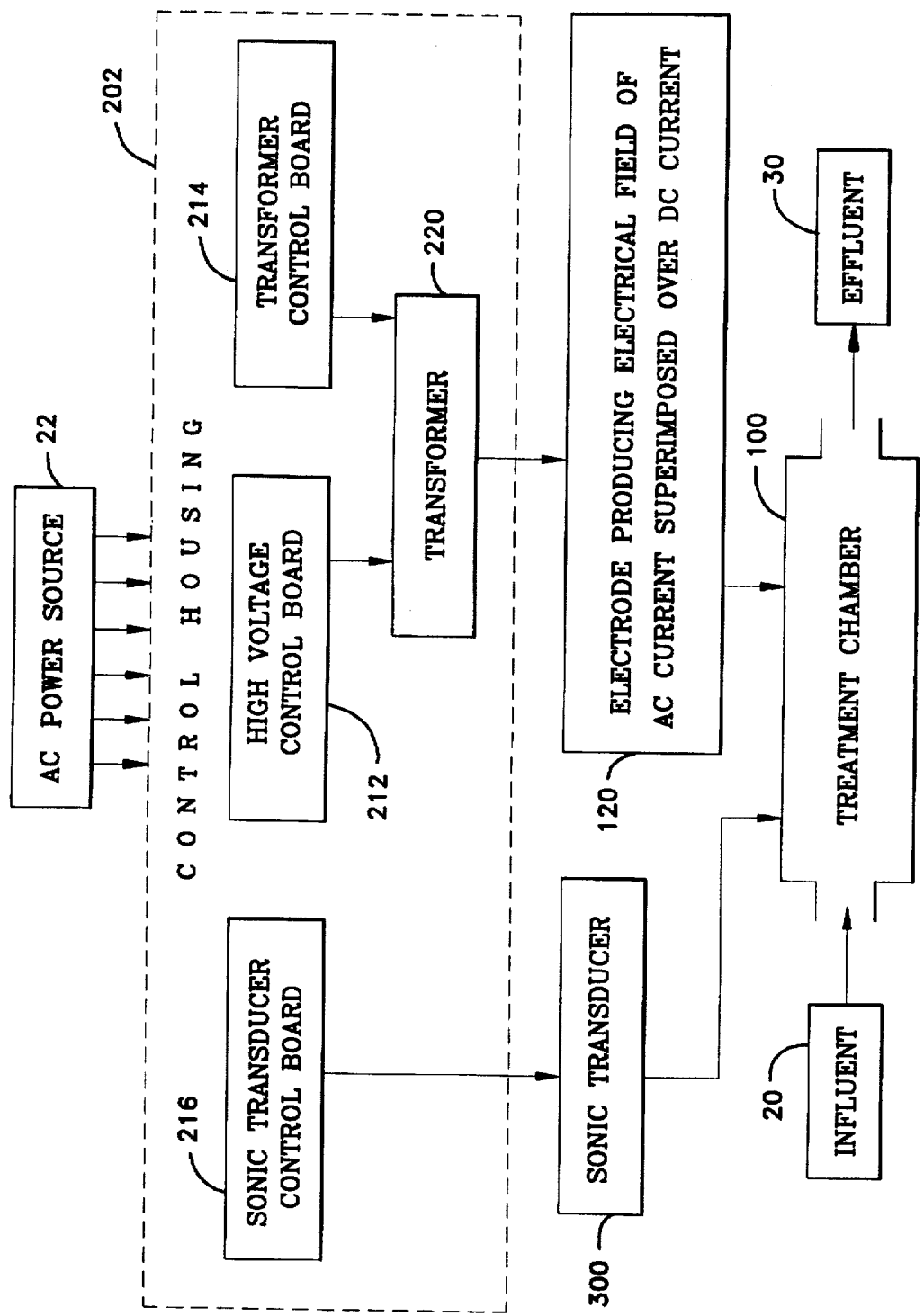
FIG. 3 is a block diagram of the components of the system.

FIG. 3 is a diagrammatic description of the treatment chamber component 100 and control component 200 as they relate to treating an influent 20 from a fluid containing system to return to the fluid containing system as an ionized effluent 30. The a.c. power source 22 is shown supplying household current and voltage to the sonic transducer control board 216, the high voltage control board 212, and the transformer control board 214. The sonic transducer 300 is operably controlled by the sonic transducer control board 216 and the 1100 V transformer 220 is shown controlled by the high voltage control board 212 and the transformer control board 214. The transformer 220 supplies the rectified and filtered a.c. voltage to the electrode 120 for production of an electrical field of a.c. superimposed on d.c. waveforms. The electrode 120 and the sonic transducer 300 are shown to act on the treatment chamber 100 concurrently.

Although the exact theory of operation is not known and Applicant does not wish to be limited to any one theory of operation, when the above described device is placed within a preexisting fluid containing system, one of the possible theories of operation is as follows. The device may generate ionic species from existing materials in the fluid or change oxidation states of ions already existing in the fluid. These ionic species can act as agents which can engage in redox reactions with the scale deposits in the fluid system, the by-products of such reaction being soluble. These reactions are enhanced by the addition of sonic energy to the system to mechanically pull scale deposits into the fluid.

It is to be understood that the present invention is not limited to the sole embodiment described above, but encompasses any and all embodiments within the scope of the following claims.

I claim:

1. An electrodynamic fluid treatment system for treatment of a fluid and removal of scale deposits, comprising:

power supply means for producing an a.c. waveform superimposed upon a d.c. waveform;

a cylindrical insulated electrode having a first end and an opposing second end, said electrode being in communication with said power supply means;

a cylindrical insulated sheath concentrically surrounding said electrode to define a fluid treatment chamber, said sheath having an inlet and an outlet a first and a second dielectric support member, said first dielectric support member being mounted onto said first end and said second dielectric support member being mounted onto said second end of said electrode;

a sonic deflector engaging said first dielectric support member, said sonic deflector having a conical end a dielectric housing sealing said first end of said electrode;

an ultrasound transducer contained within said dielectric housing proximate said conical end of said sonic deflector; and a sealing member sealingly engaging said second end of said electrode.

2. The treatment system according to claim 1 further comprising a housing adapted to house said system in an integral unit.

3. The treatment system according to claim 1, wherein said transducer operates at 42,000 cps.

4. The treatment system according to claim 1, wherein said power supply means is a filter and rectifying circuit for producing a d.c. voltage of 2000 volts having a superimposed a.c. ripple voltage waveform.

* * * * *